(12) United States Patent
Barensteiner et al.

(10) Patent No.: US 10,532,439 B2
(45) Date of Patent: Jan. 14, 2020

(54) DEVICE FOR SHARPENING TOOLS WITH CUTTERS, SUCH AS FOR EXAMPLE DRILLS, MILLING TOOLS OR THE LIKE

(71) Applicant: Vollmer Werke Maschinenfabrik GmbH, Biberach (DE)

(72) Inventors: Ulrich Barensteiner, Leutkirch (DE); Joachim Bott, Hochdorf (DE); Manuel Gerst, Biberach (DE); Manfred Saegmueller, Ummendorf (DE)

(73) Assignee: Vollmer Werke Maschinenfabrik GmbH, Biberach (DE)

( * ) Notice: Subject to any disclaimer, the term of this patent is extended or adjusted under 35 U.S.C. 154(b) by 87 days.

(21) Appl. No.: 14/404,380

(22) PCT Filed: May 28, 2013

(86) PCT No.: PCT/EP2013/060951
§ 371 (c)(1),
(2) Date: Nov. 26, 2014

(87) PCT Pub. No.: WO2013/178625
PCT Pub. Date: Dec. 5, 2013

(65) Prior Publication Data
US 2015/0111479 A1    Apr. 23, 2015

(30) Foreign Application Priority Data
May 30, 2012   (DE) .................. 10 2012 010 689

(51) Int. Cl.
*B24B 41/02*      (2006.01)
*B23Q 1/44*       (2006.01)
(Continued)

(52) U.S. Cl.
CPC .................. *B24B 3/24* (2013.01); *B23C 1/10* (2013.01); *B23C 1/12* (2013.01); *B23Q 1/015* (2013.01);
(Continued)

(58) Field of Classification Search
CPC . B24B 27/0061; B24B 27/0084; B24B 41/02; B23Q 1/017; B23Q 1/4852;
(Continued)

(56) References Cited

U.S. PATENT DOCUMENTS

| | | | |
|---|---|---|---|
| 1,373,957 A | 4/1921 | Farnum | |
| 4,484,387 A * | 11/1984 | Nachmany | B23Q 1/01 409/137 |

(Continued)

FOREIGN PATENT DOCUMENTS

| | | |
|---|---|---|
| CH | 692450 A5 | 6/2002 |
| CH | 698920 B1 | 12/2009 |

(Continued)

*Primary Examiner* — Eileen P Morgan
(74) *Attorney, Agent, or Firm* — Wood Herron & Evans LLP

(57) ABSTRACT

The invention relates to a device (10) for machining work pieces, particularly for sharpening tools with cutters for cutting-machining, such as for example drills, milling tools or the like, the device (10) comprising a monolithic machine block (12) with at least two functional surfaces (14, 16) disposed at an angle with respect to each other, a work piece support arrangement (18) for clamping-in a work piece (38) to be machined, a machining unit (20), on which at least one tool (66, 68, 70) can be attached to machine the work piece (38), and a support (22), on which the machining unit (20) can be displaceably attached, wherein on a first functional surface (14) of the two functional surfaces (14, 16) of the machine block (12) the machine block (12) has at least one first linear guide (24, 26) for guiding a work piece support arrangement (18) along at least one first guide axis (X1), and (Continued)

Figure 1:
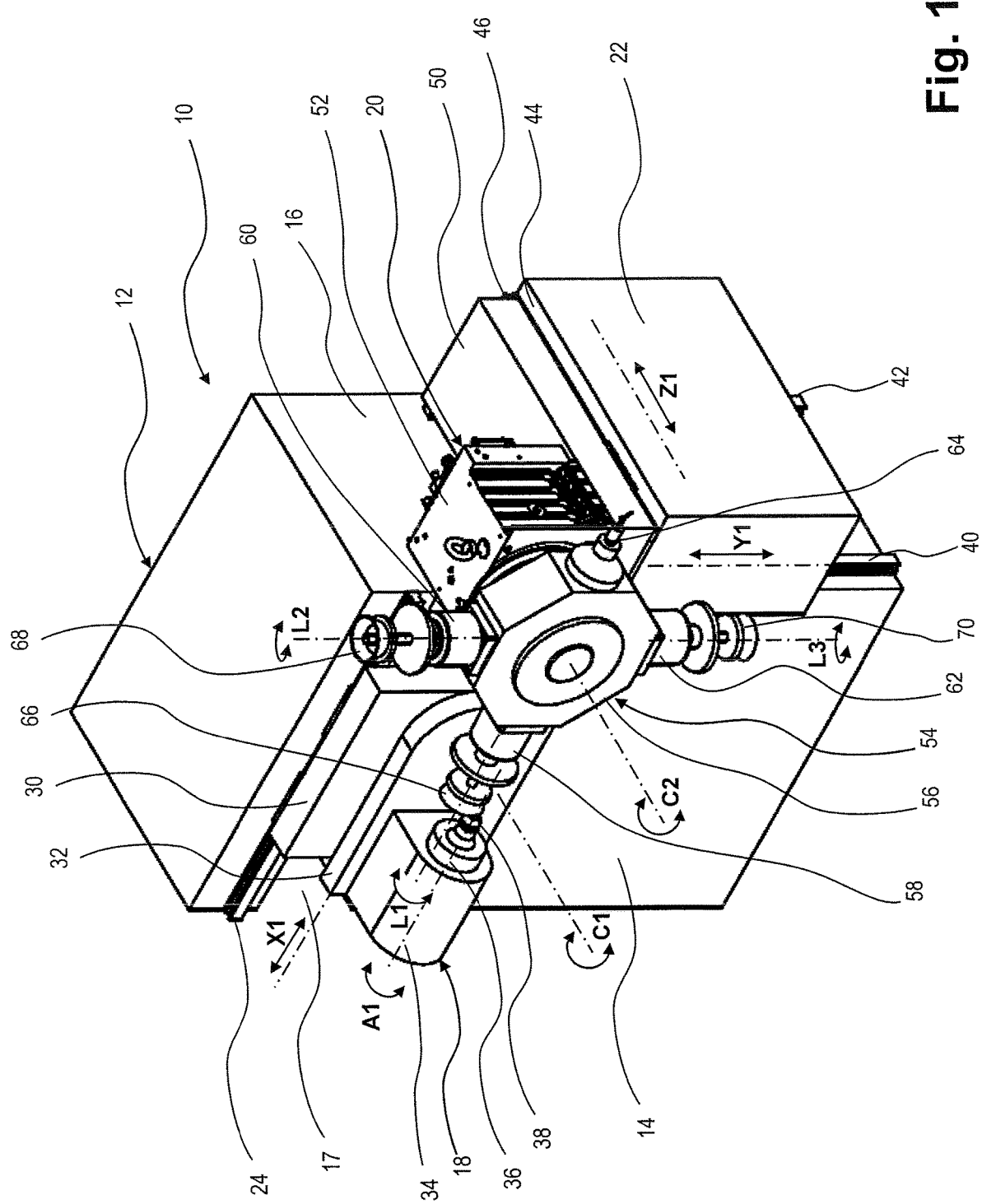

on the second functional surface (16) of the two functional surfaces (14, 16) of the machine block (12) the machine block has at least one second linear guide (40, 42) for guiding the support (22) for the machining unit (20) along at least one second guide axis (Z1), the first functional surface (14) or the second functional surface (16) being allocated at least one third linear guide (46, 48) for guiding the work piece support arrangement (18) or the machining unit (20) along a third guide axis (Y1), the machining unit (20) being displaceable relative to the support (22), the first, second and third guide axes (X1, Y1, Z1) each extending inclined with respect to the other, the work piece support arrangement (18) being formed with a first axis of rotation (A1) for rotating the work piece (38) and the machining unit (20) or the work piece support arrangement (18) being pivotable about at least one second axis of rotation (C1, C2, B1).

12 Claims, 11 Drawing Sheets

(51) Int. Cl.

| | | |
|---|---|---|
| B23C 1/10 | (2006.01) | |
| B23C 1/12 | (2006.01) | |
| B24B 3/24 | (2006.01) | |
| B24B 3/02 | (2006.01) | |
| B24B 27/00 | (2006.01) | |
| B23Q 1/48 | (2006.01) | |
| B23Q 1/01 | (2006.01) | |

(52) U.S. Cl.
CPC .............. *B23Q 1/017* (2013.01); *B23Q 1/44* (2013.01); *B23Q 1/4852* (2013.01); *B24B 3/02* (2013.01); *B24B 27/0061* (2013.01); *B24B 27/0084* (2013.01); *B24B 41/02* (2013.01)

(58) Field of Classification Search
CPC .. B23Q 1/015; B23Q 1/44; B23Q 1/64; B23C 1/10; B23C 1/12
USPC ............................................ 451/143
See application file for complete search history.

(56) References Cited

U.S. PATENT DOCUMENTS

| | | | | |
|---|---|---|---|---|
| 4,617,764 A * | 10/1986 | Reibakh | ........ | B24B 17/10 451/11 |
| 5,961,260 A * | 10/1999 | Kasler | ........ | B23F 9/10 409/137 |
| 6,120,355 A * | 9/2000 | Stadtfeld | ........ | G01M 13/021 451/218 |
| 6,293,742 B1 * | 9/2001 | Miyagi | ........ | B23B 23/00 29/40 |
| 6,357,094 B1 * | 3/2002 | Sugimoto | ........ | B23Q 1/012 29/26 A |
| 6,669,415 B2 * | 12/2003 | Stadtfeld | ........ | B23F 9/025 409/26 |
| 6,712,566 B2 | 3/2004 | Stadtfeld et al. | | |
| RE38,504 E * | 4/2004 | Kasler | ........ | B23F 9/10 409/137 |
| 7,364,391 B1 * | 4/2008 | Stadtfeld | ........ | B23F 5/207 409/2 |
| 7,553,115 B2 * | 6/2009 | McGlasson | ........ | B23F 19/02 409/27 |
| 7,794,186 B2 * | 9/2010 | Peiffer | ........ | B23F 9/10 409/40 |
| 8,066,548 B1 | 11/2011 | Elie et al. | | |
| 8,414,233 B2 * | 4/2013 | Matsui | ........ | B23Q 1/44 409/201 |
| 8,714,535 B2 * | 5/2014 | Jung | ........ | B23Q 1/017 269/57 |
| 9,539,684 B2 * | 1/2017 | Honegger | ........ | B23Q 5/36 |
| 9,878,409 B2 * | 1/2018 | Grob | ........ | B23Q 1/4804 |
| 2005/0255793 A1 * | 11/2005 | Junker | ........ | B24B 5/14 451/11 |
| 2005/0260050 A1 * | 11/2005 | Ribbeck | ........ | B23C 5/22 409/39 |
| 2006/0128274 A1 * | 6/2006 | Nyffenegger | ........ | B24B 19/11 451/11 |
| 2008/0220697 A1 * | 9/2008 | Hyatt | ........ | B23B 3/168 451/21 |
| 2009/0112355 A1 * | 4/2009 | Hyatt | ........ | B24B 27/0061 700/164 |
| 2010/0024233 A1 | 2/2010 | Boland et al. | | |

FOREIGN PATENT DOCUMENTS

| | | |
|---|---|---|
| DE | 3034788 A1 | 4/1981 |
| DE | 3206547 A1 | 9/1983 |
| DE | 4135823 A1 | 5/1993 |
| DE | 4242906 A1 | 6/1994 |
| DE | 19844242 C2 | 9/2000 |
| DE | 20104030 U1 | 6/2001 |
| DE | 10012445 A1 | 9/2001 |
| DE | 10213778 A1 | 10/2003 |
| DE | 10259215 A1 | 7/2004 |
| DE | 19840801 B4 | 9/2005 |
| DE | 102005011306 A1 | 9/2006 |
| DE | 102006035164 B4 | 1/2009 |
| DE | 102008007233 A1 | 6/2009 |
| DE | 102011000335 A1 | 7/2012 |
| EP | 0023876 A1 | 2/1981 |
| EP | 0640435 B1 | 12/1999 |
| EP | 1363757 B1 | 3/2007 |
| EP | 1910000 B1 | 11/2008 |
| EP | 2060359 B1 | 7/2011 |
| EP | 1745877 B1 | 9/2011 |
| JP | 56082149 | 4/1981 |
| WO | 0266193 A1 | 8/2002 |
| WO | 2011087759 A1 | 7/2011 |

* cited by examiner

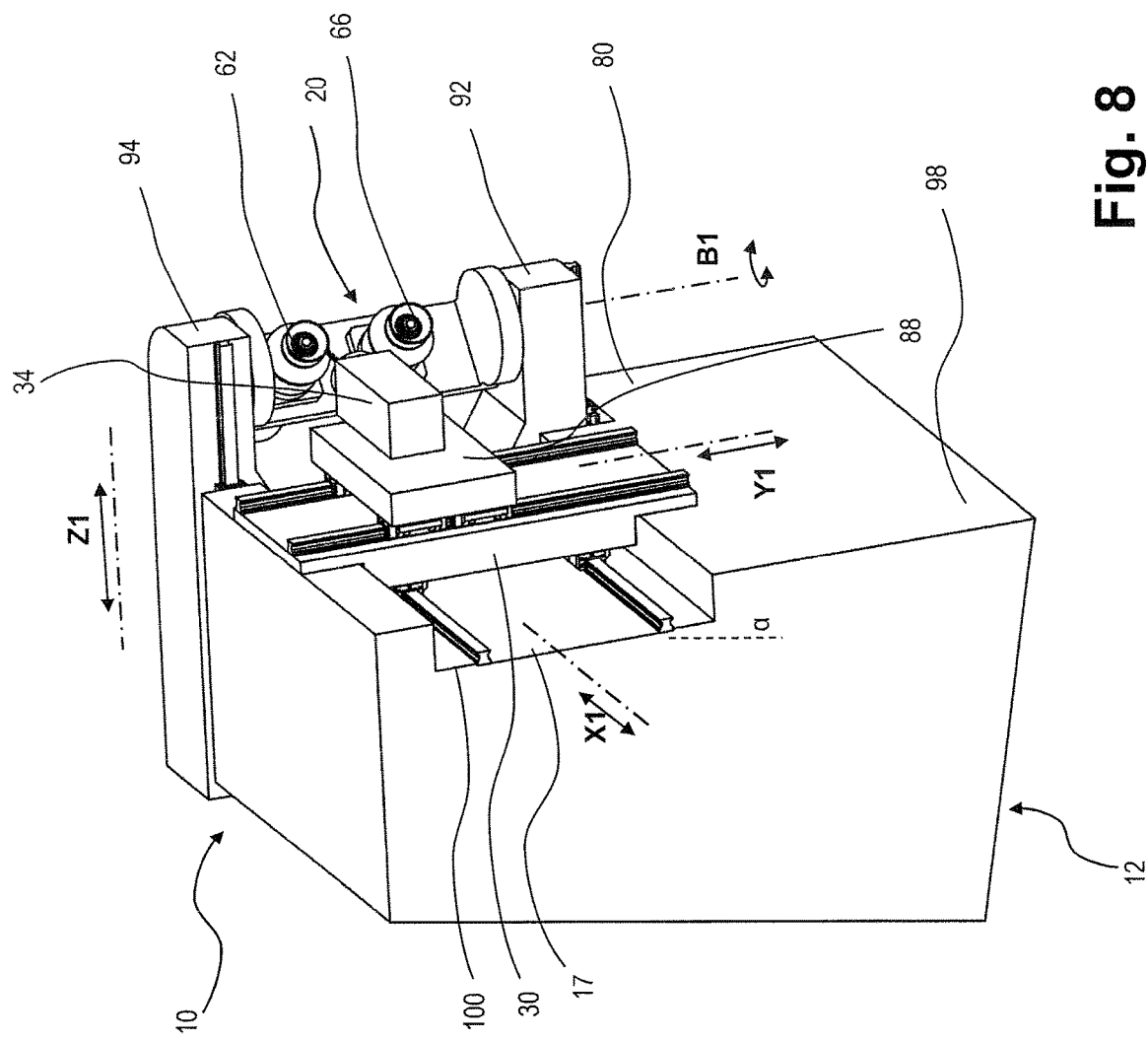
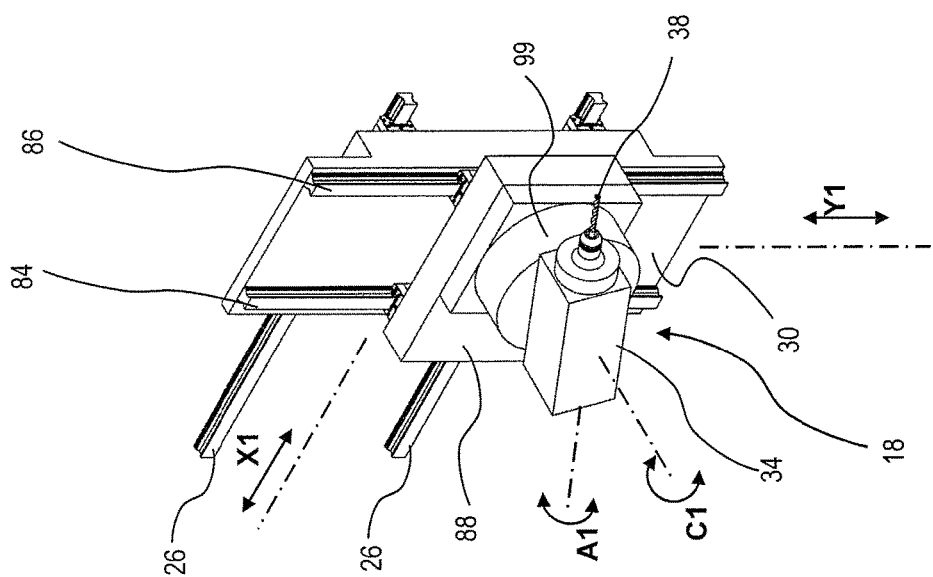
Fig. 8
Fig. 7c

DEVICE FOR SHARPENING TOOLS WITH CUTTERS, SUCH AS FOR EXAMPLE DRILLS, MILLING TOOLS OR THE LIKE

The present invention relates to a device for sharpening tools with cutters for machining or cutting, such as for example drills, milling tools or the like.

The importance of sharpening tools used for a variety of machining tasks is becoming ever greater. The increasing complexity of the geometry of tools which enable, for example, several surfaces of a workpiece composed of hard materials to be machined in a single operating step means that the initial outlay on such tools is considerable. Since tools of this type have to be used as long as possible, it is also necessary to resharpen their cutting edges regularly in addition to the initial sharpening during the manufacture of the tools in order to ensure dimensionally stable machining of the workpieces. Grinding plays a significant role in such machining tasks for the initial sharpening and resharpening of tools, which are machined as "workpieces" during the sharpening operation. However, other machining processes are also increasingly used during the sharpening operation, such as for example erosion machining or laser machining.

The prior art discloses a plurality of solutions, particularly in the field of grinding machines, which are more or less equal to the requirements of sharpening tools.

For example, document DE 198 44 242 C2 discloses a universal grinding machine in which the workpiece is attached to a slide in an angled alignment and a machining unit is guided on a tower-like guide. A similar solution is disclosed in document CH 698 920 B1 and document EP 0 023 876 A1.

Document DE 201 04 030 U1 discloses a grinding machine in table design in which the machining unit is likewise attached to a tower and guided in the vertical direction.

CH 692 450 A5 discloses a grinding machine in which the grinding tools are attached to a machining unit which is guided relative to a machine base by way of a portal. This grinding machine is of a relatively large construction and requires a relatively large floor space.

A solution which is likewise associated with the portal design is disclosed in document DE 42 42 906 A1. Although this grinding machine is of a smaller construction than the grinding machine described above, its design is relatively complex and enables only a few modifications for adaptation to different machining situations.

Document DE 41 35 823 A1 discloses a grinding machine tool with a machine stand which has a substantially T-shaped cross-sectional surface in its upper region. This T-shaped cross-sectional surface is formed by a longitudinal limb and a transverse limb. Arranged on a vertical side face of the longitudinal limb or the cuboidal part is a vertical guide on which a lower slide is vertically displaceable, i.e. in the X-direction. Arranged on the lower slide is a horizontal guide on which an upper slide is horizontally displaceable, i.e. in the Z-direction. The upper slide supports a workpiece spindle head with a workpiece spindle which is rotatable about an axis of rotation which is parallel to the X-axis. Constructed on the upper end face of the transverse limb is a horizontal guide on which a grinding head slide is mounted such that it is displaceable in the Y-direction. A grinding head support, which supports the grinding head, is arranged on the grinding head slide. Rotatably mounted in the grinding head is a grinding spindle to which a grinding tool can be attached at its free end. The grinding head is arranged on the grinding head support such that it is pivotable about a pivot axis by way of an arm.

Document U.S. Pat. No. 8,066,548 B1 describes a cube-shaped machine frame. One side of the main frame rails are provided, along which a support is displaceable in the X-direction. The support in turn has rails by way of which a further slide or support can be displaced in the Y-direction. One of the sides of the main frame and the support each have openings and, which enable a free movement of a spindle in the X- and Y-direction. Rails along which the support is displaceable in the Z-direction are provided on the side of the frame. The support and one of the sides of the main frame have openings through which a rotatable arrangement extends, which can rotate about an axis.

The grinding machines from the prior art, which are described above, are also generally equal to complex machining tasks owing to the number and arrangement of their machining axes, although they all have a relatively complex construction which requires a relatively large installation area and floor space. Moreover, these grinding machines can only be adapted to different machining situations or client-specific requirements to a greatly limited extent—if at all. It has therefore been shown that the requirement is not always for universal machines which can be used for a variety of machining tasks. Machines which are individually adapted to particular machining tasks are instead desirable. It is therefore often unnecessary to provide a universal grinding machine if a substantial number of the machining situations for which this can be used are neither required nor implemented by the user. Instead, cutting machines, in particular grinding machines, which are matched specifically to the machining situations faced by the user are also preferred for reasons of improved cost-effectiveness.

It is the object of the present invention to provide a device of the type described at the outset, which enables specific adaptation to the respective machining situations with a simple and compact construction.

This object is achieved by a device for machining workpieces, in particular for the initial sharpening and resharpening of tools with cutters for machining or cutting, such as for example drills, milling tools or the like, by the features according to claim 1.

In particular, the device according to the present invention comprises:
   a monolithic machine block with at least two functional surfaces arranged at an angle with respect to one another,
   a workpiece support arrangement for clamping a workpiece to be machined,
   a machining unit to which at least one tool can be attached for machining the workpiece, and
   a support, to which the machining unit is displaceably attached,
wherein, on a first functional surface of the two functional surfaces, the machine block has a first linear guide for guiding a workpiece support arrangement along a first guide axis and, on the second functional surface of the two functional surfaces, the machine block has a second linear guide for guiding the support for the machining unit along a second guide axis, wherein the first functional surface or the second functional surface is allocated at least one third linear guide for guiding the workpiece support arrangement or the machining unit along a third guide axis, wherein the machining unit is displaceable relative to the support, wherein the first, second and third guide axis each extend at an angle with respect to one another, wherein the workpiece support arrangement is constructed with a first axis of rotation for rotating the workpiece, and wherein the machining unit or the workpiece support arrangement is pivotable about at least one second axis of rotation.

The device according to the present invention has the advantage of an extremely compact construction in which all the components are arranged on a single monolithic machine block. Complex structures, such as for example the combination of a machine table with a portal or tower supporting the machining unit, are by contrast disadvantageous in that they require a considerably greater floor space and have a more complex construction. Moreover, the device according to the invention has the advantage of a modular structure. Depending on requirements or depending on the desired application, individual components can be retrofitted or custom-designed. Therefore, it is for example possible for both the machining unit and the workpiece support arrangement to be more or less complex in design based on requirements, as is demonstrated in detail below in the description of the individual embodiments. This adaptation to the respective applications can be effected by slight changes to the device according to the invention, whilst the basic concept remains unchanged. The basis for this advantage is that all components are arranged and guided on the single monolithic machine block.

A further advantage of the present invention consists in the good accessibility of the different components, in particular the machining unit and the workpiece support arrangement. This enables particularly advantageous integration of the device according to the invention in automated production because both tools therefore workpieces can be supplied or removed easily.

Individual further developments of the invention are explained in detail below with reference to the dependent claims According to a further development of the present invention, provision can be made for the support to have a further functional surface to which the third linear guide is attached for guiding the machining unit relative to the support along a third guide axis. However, it is also alternatively possible for the support to have no linear guide and instead for the third linear guide to be associated with a slide which has the workpiece support arrangement. It is merely important that, with their guide axes, the three linear guides span a coordinate system of three axes extending at an angle to one another in pairs. A preferred embodiment of the invention provides for these guide axes to be arranged orthogonally to one another. The guide axes can be arranged in such a way that, in the operational state of the device, the first and third guide axis extend substantially horizontally and the second guide axis extends substantially vertically. However, this preferred embodiment is also not compulsory. Further embodiments of the invention also demonstrate arrangements in which the guide axes are in a space deviating from the horizontal or vertical, for example by an angle in the range between 0° and 30°.

A further development of the invention provides for the two functional surfaces of the machine block to be arranged substantially perpendicular to one another. According to the invention, provision can be made here for the monolithic machine block to be of a substantially cuboidal construction, with the first functional surface being greater than the second functional surface. Therefore, the first linear guide of the workpiece support arrangement can be attached to a large surface of the cuboidal machine block to thereby ensure large adjustment paths for the workpiece, i.e. the tool to be sharpened. It is thus also possible to machine relatively long shaft tools. With such a design of the monolithic machine block, a further development of the invention provides for the first linear guide of the workpiece support arrangement to be constructed substantially over the entire length of the first functional surface. This enables the greatest possible adjustment paths to be achieved.

However, according to the invention it is not necessary for the two functional surfaces of the monolithic machine block to extend vertically. Provision can alternatively be made for at least one of the two functional surfaces of the machine block to be inclined with respect to the vertical, for example at an angle of at least 10°. It is possible here for the entire machine block to be constructed with a functional surface which is set at an angle in this way, for example in a wedge shape, or to construct only individual surface portions on the machine block with a corresponding incline, for example a functional surface portion in a recess or on a projection of the monolithic machine block. The guide axes are then also inclined accordingly, as already indicated in general above.

According to the invention, provision can furthermore be made for the machine block to have at least one projection with a horizontal surface, with it being possible for one of the two linear guides to be arranged partially or completely in the region of this projection on the horizontal surface. It is alternatively also possible to provide a surface which is inclined with respect to the horizontal, for example by at least 10°, and to arrange the respective linear guide on this.

In conjunction with the arrangement of the linear guides, it is particularly possible to provide for the workpiece support arrangement to be attached to a first slide which is guided along the first linear guide. The workpiece support arrangement can furthermore be pivotable about the first axis of rotation relative to this first slide. As already indicated above, it is also possible to provide a further linear guide on this slide, which guides a second slide. Therefore, the workpiece support arrangement can be attached to a cross slide arrangement. The modular attachment of the workpiece support arrangement to a separate slide makes it moreover possible to use differently constructed workpiece support arrangements on the slide as required and to exchange these as needed. In other words, the module "workpiece support arrangement" in this variant embodiment can therefore be simply replaced as required.

A further development of the invention provides for the workpiece support arrangement to be attached to a pivot arm or pivot plate which is pivotable about the first axis of rotation relative to the first slide. Taking into account the length of the pivot arm and positioning of the first axis of rotation relative to the pivot arm and the workpiece support arrangement arranged thereon, it is possible for the position of the workpiece to be adjusted as desired. For example, the pivot plate enables a purely rotational adjustment of the workpiece support arrangement about an axis of rotation.

In terms of the attachment of the machining unit, in a further development of the invention it can be provided for the support to be formed by a further monolithic block to which the third linear guide is attached. The support can therefore also serve as an interface for attaching the "machining unit" module, with it being possible to design this interface according to requirements. For this, it is in turn possible to provide a vertical or horizontal functional surface, or one which extends at an angle with respect to the vertical or horizontal. The inclination of the angled surface is for example at least 10°.

According to the invention, provision can furthermore be made for the support to have at least one fork for receiving at least one rocker on which the machining unit is mounted such that it is pivotable at least about the second axis of rotation or a further axis of rotation. The second or further axis of rotation here can extend substantially in the vertical direction.

In the variant embodiment of the inventive device with at least one pivotable rocker, it is possible to provide a plurality of rotationally driven spindles for driving different tools. For example, it is possible to provide two spindles which are aligned in the same direction or in opposite directions and have substantially parallel axes of rotation. These two spindles can each be driven separately by way of separate drive motors. However, it is also possible to provide only one drive motor and for this drive motor to drive one spindle or both spindles by way of a respective intermediate gear. The term "gear" is used broadly here. Belt drives are particularly suitable. The belt drives here can be arranged in staggered and space-saving manner.

A further development of the invention provides for a plurality of rockers to be mounted on the at least one fork such that they are pivotable relative to one another and relative to the respective fork about the second axis of rotation. Provision can be made here for two mutually adjacent rockers to preferably be mounted relative to one another by way of a joint portion. The joint portion can be a swivel joint or other pivot joint with one or more degrees of freedom. In a simple variant embodiment, the swivel point of the joint portion constructed as a swivel joint is on or near to the second axis of rotation.

A further development of the invention provides for the workpiece support arrangement to have a first rotational spindle with which the workpiece is rotatable about a workpiece longitudinal axis. It is when machining shaft tools, such as drills, milling tools or the like, that that these have to be rotated about their longitudinal axis during the machining process, which is enabled by the first rotational spindle of the workpiece support arrangement.

According to the invention, it can furthermore be provided for the machining unit to be attached to a second slide guided on the third linear guide. According to the invention, it is possible here for the machining unit to be pivotable about the second axis of rotation relative to the second slide. This pivoting capacity enables the machining tool to be set at different angles relative to the workpiece in order to also enable adequate machining of complex workpiece geometries.

Depending on the application, provision can be made according to the invention for the machining unit to have at least one rotationally-drivable grinding disc and/or at least one eroding tool, preferably a rotationally-drivable eroding disc and/or at least one laser head and/or at least one measuring sensor. Particularly for use when grinding or eroding, a further development of the invention provides for the machining unit to have at least one rotational spindle for rotationally driving a tool associated therewith.

In order to satisfy a plurality of machining situations, a further development of the invention provides for the machining unit to have a revolver arrangement on which at least two machining tools or at least one machining tool and at least one measuring sensor are arranged, in which case a tool which is to be used for machining or a measuring sensor which is to be used can be moved into an active position by rotating the machining unit about the second axis of rotation. According to the invention, provision can be made here for each machining tool to be allocated a rotational spindle. As explained above for the variant embodiment with the rocker, it is however also possible in these variant embodiments for individual machining tools to be driven by a common drive.

All the guides and axes of rotation of the device according to the invention are preferably motor-driven separately or in combination and can be accurately controlled and positioned numerically in conventional manner.

Figure 3:
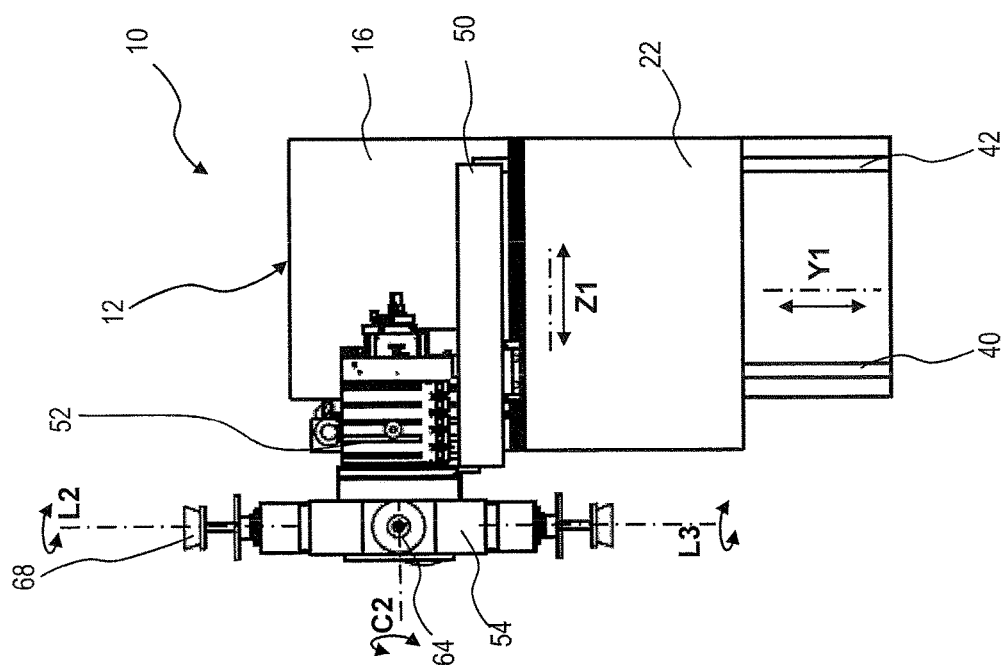
Figure 2:
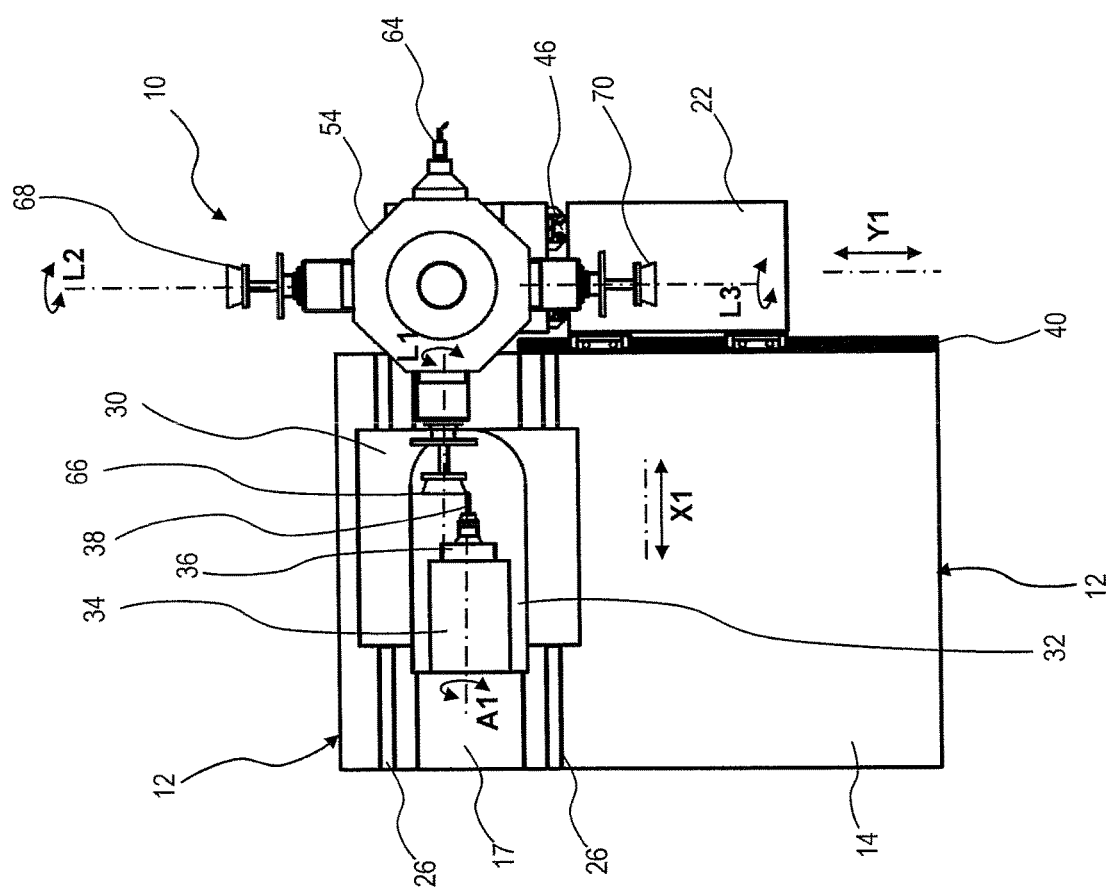
Figure 4:
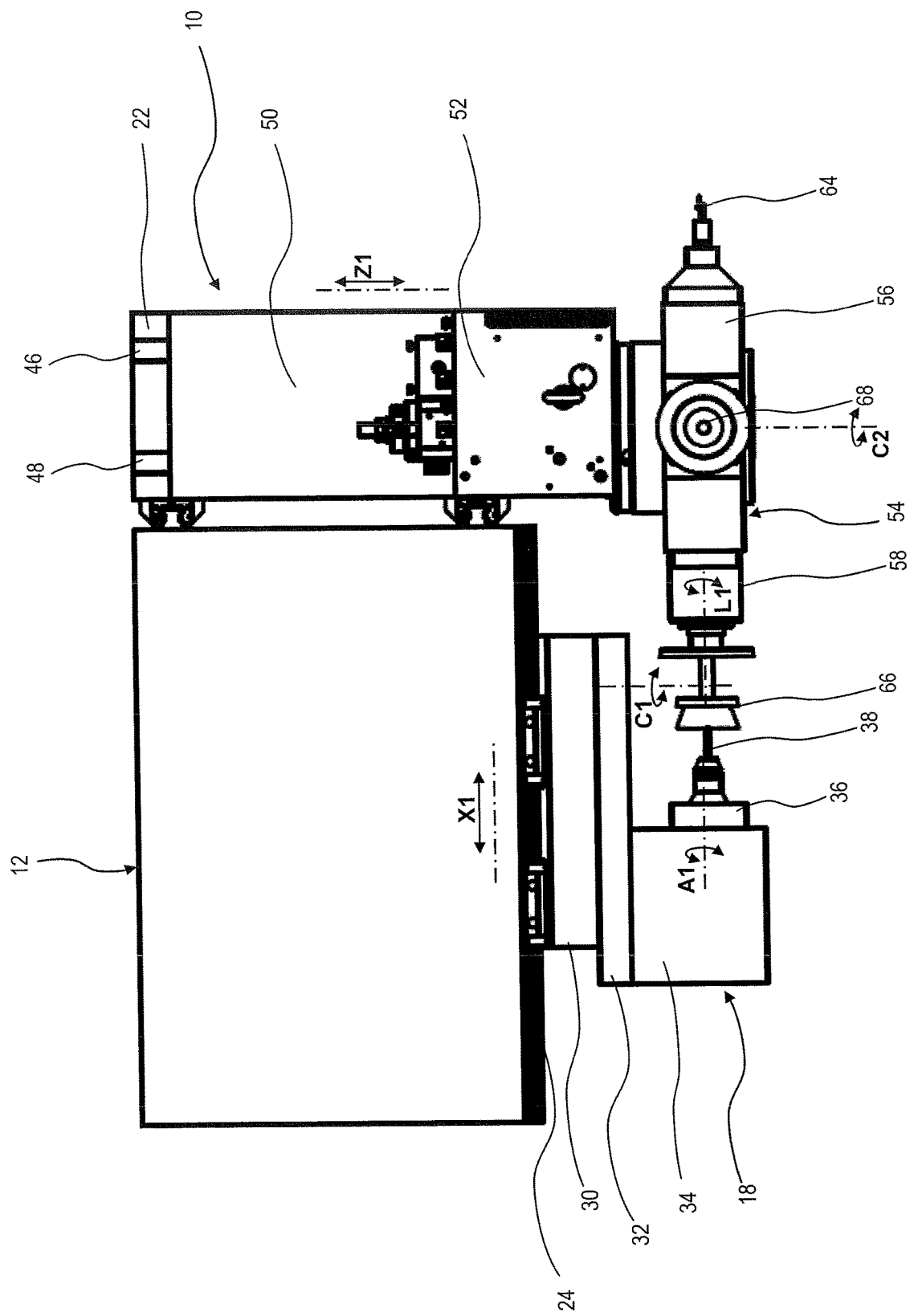
Figure 5:
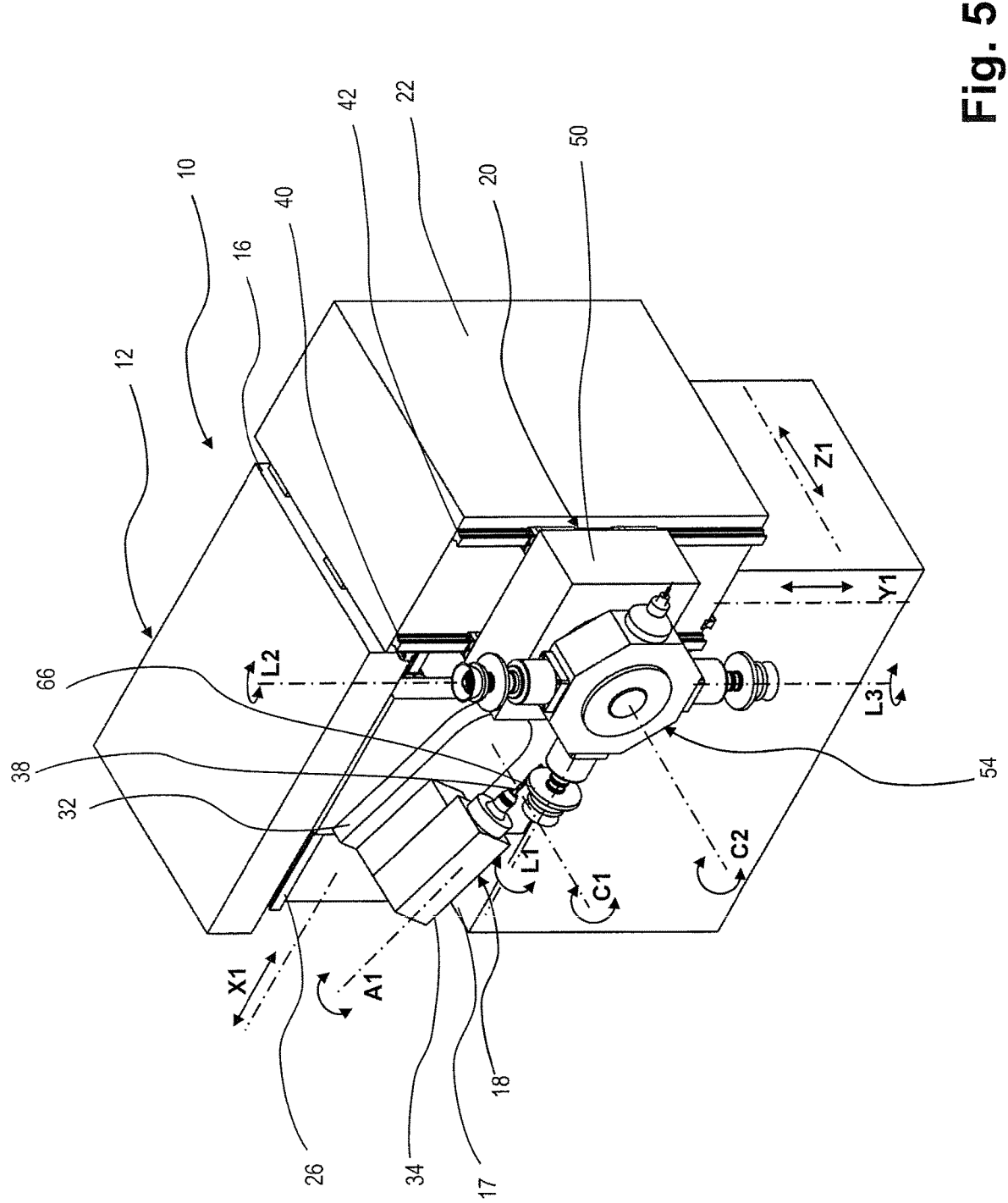
Figure 6:
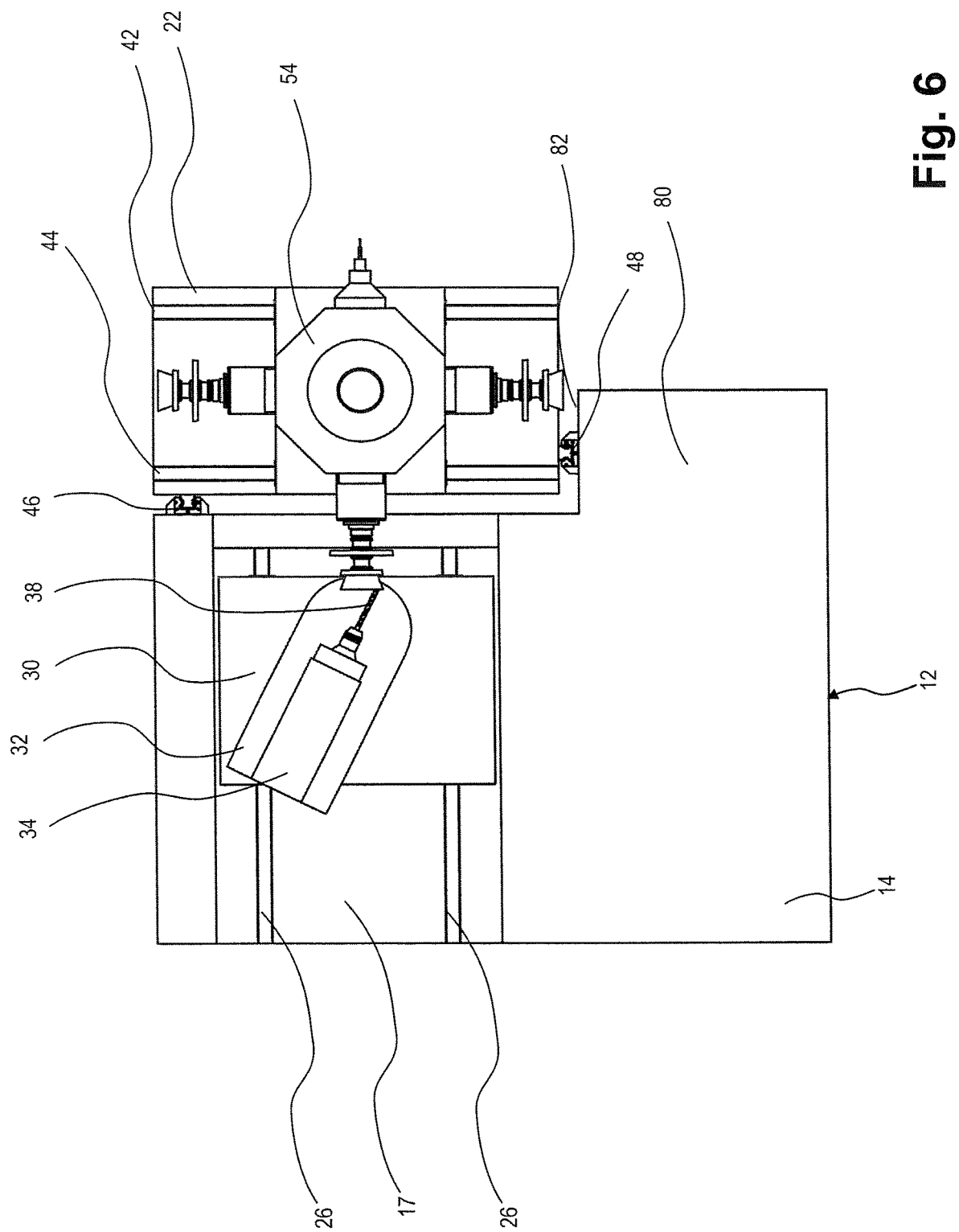
Figure 7A:
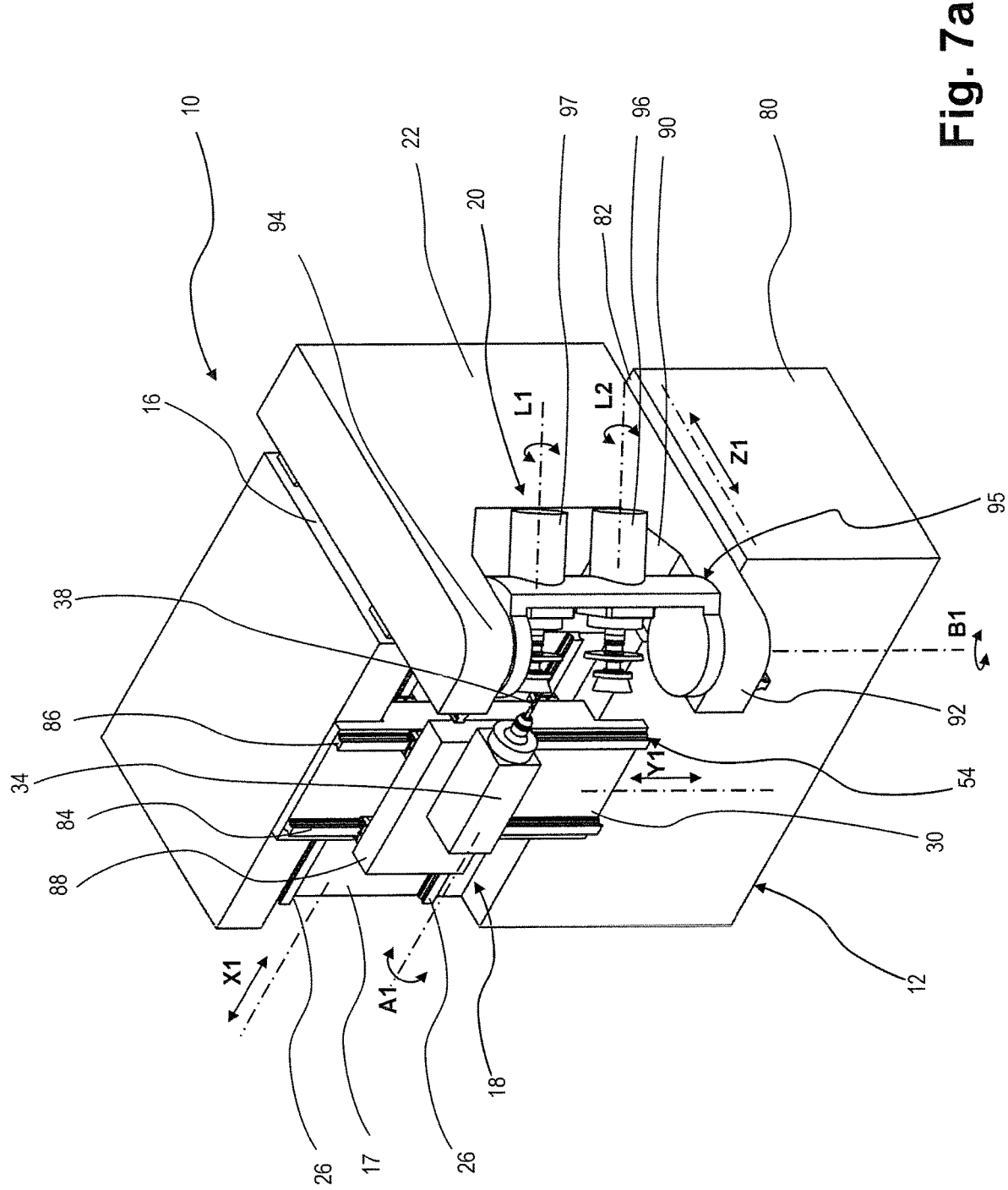
Figure 7B:
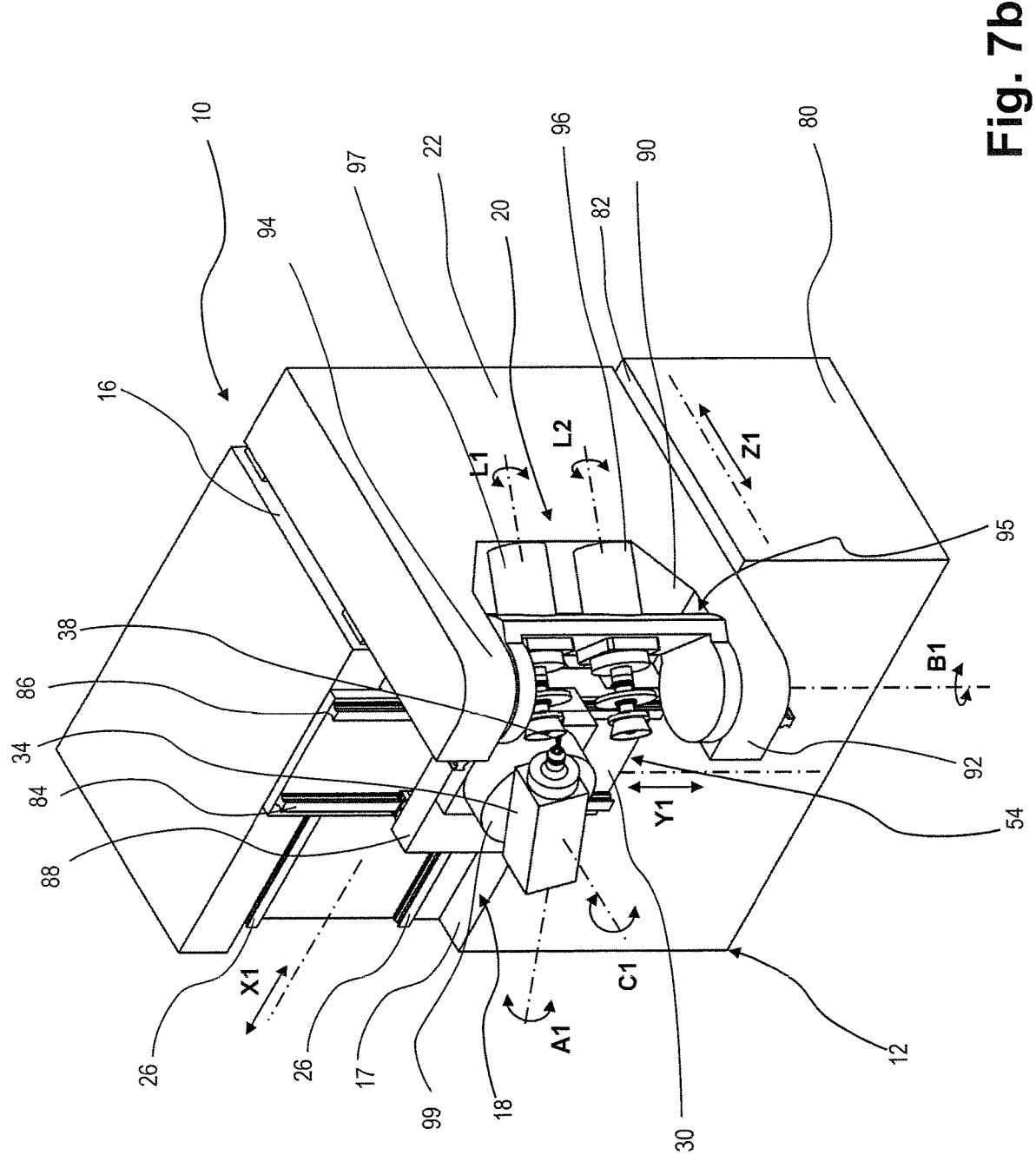
Figure 10:
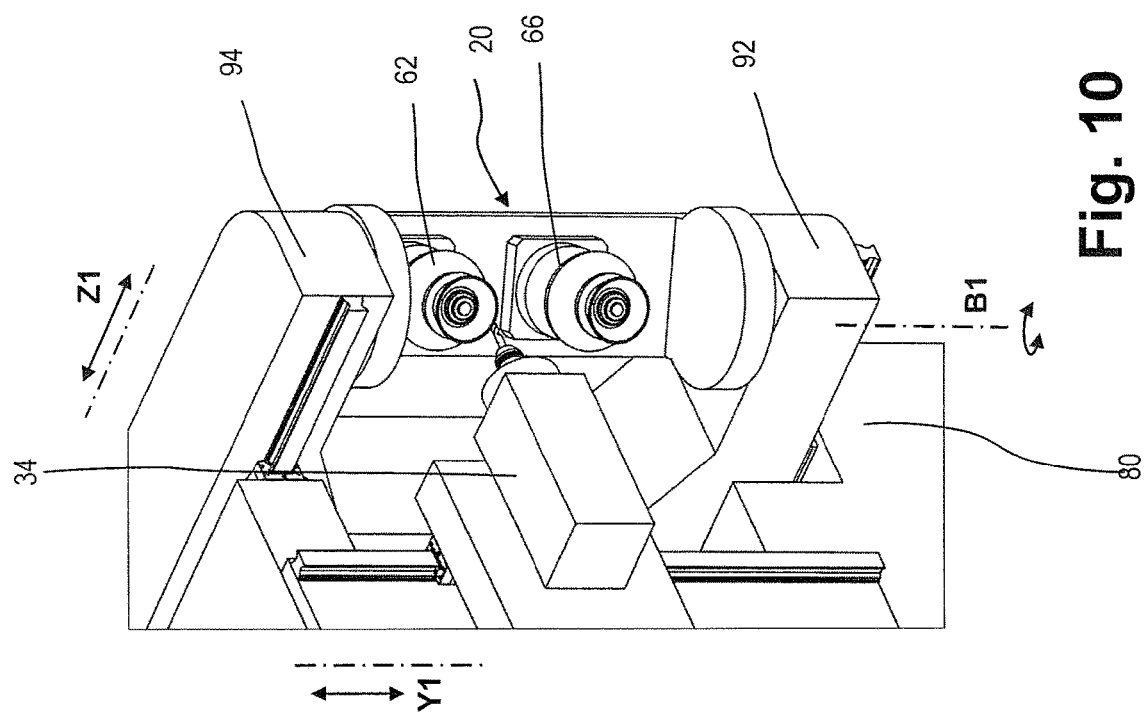
Figure 9:
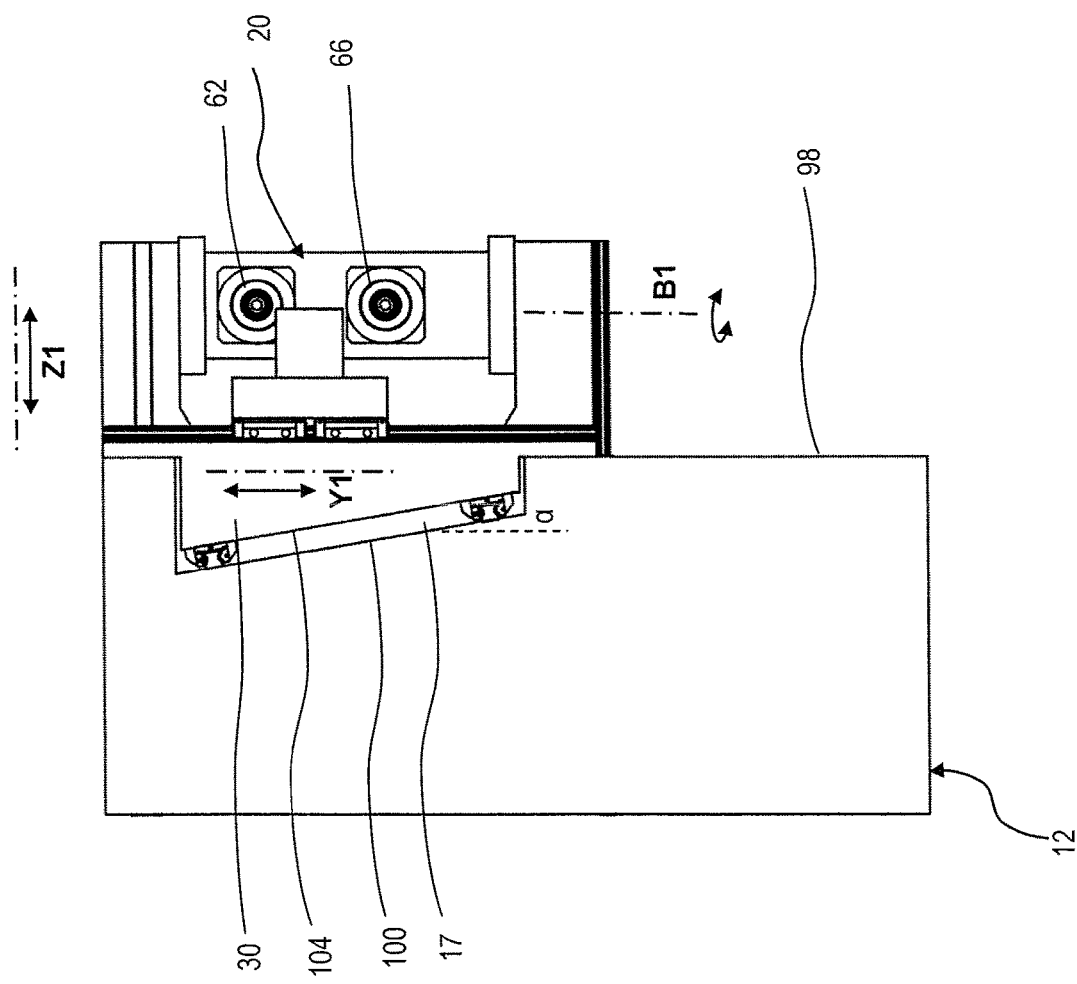
Figure 13:
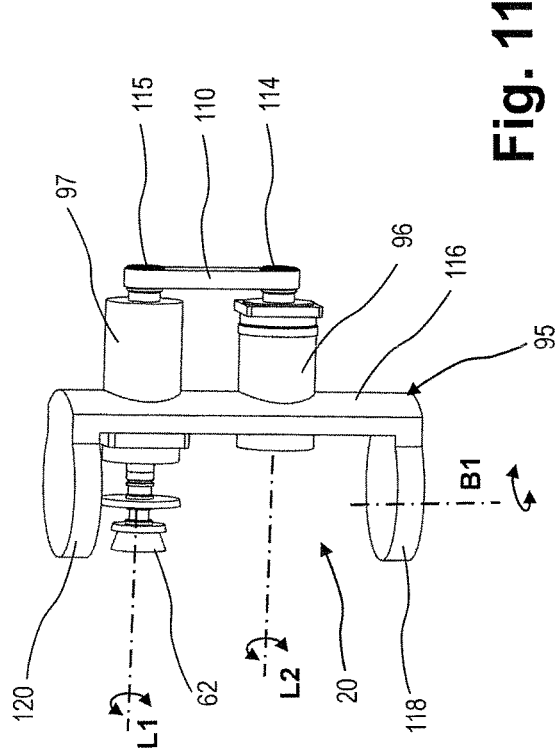
Figure 14:
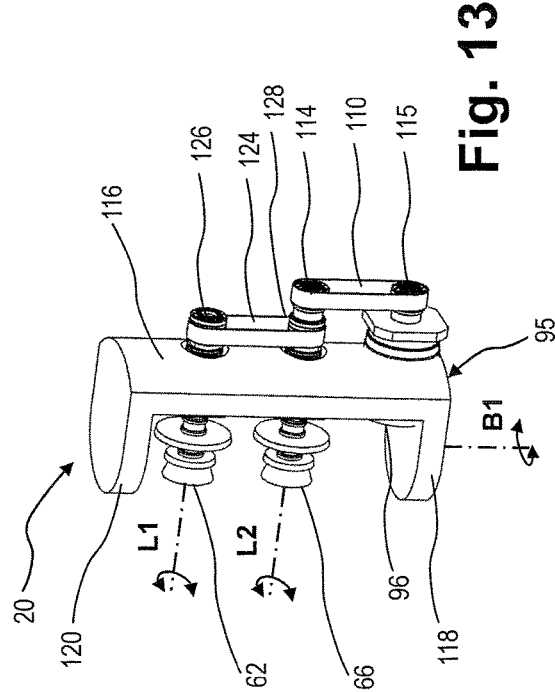
Figure 15:
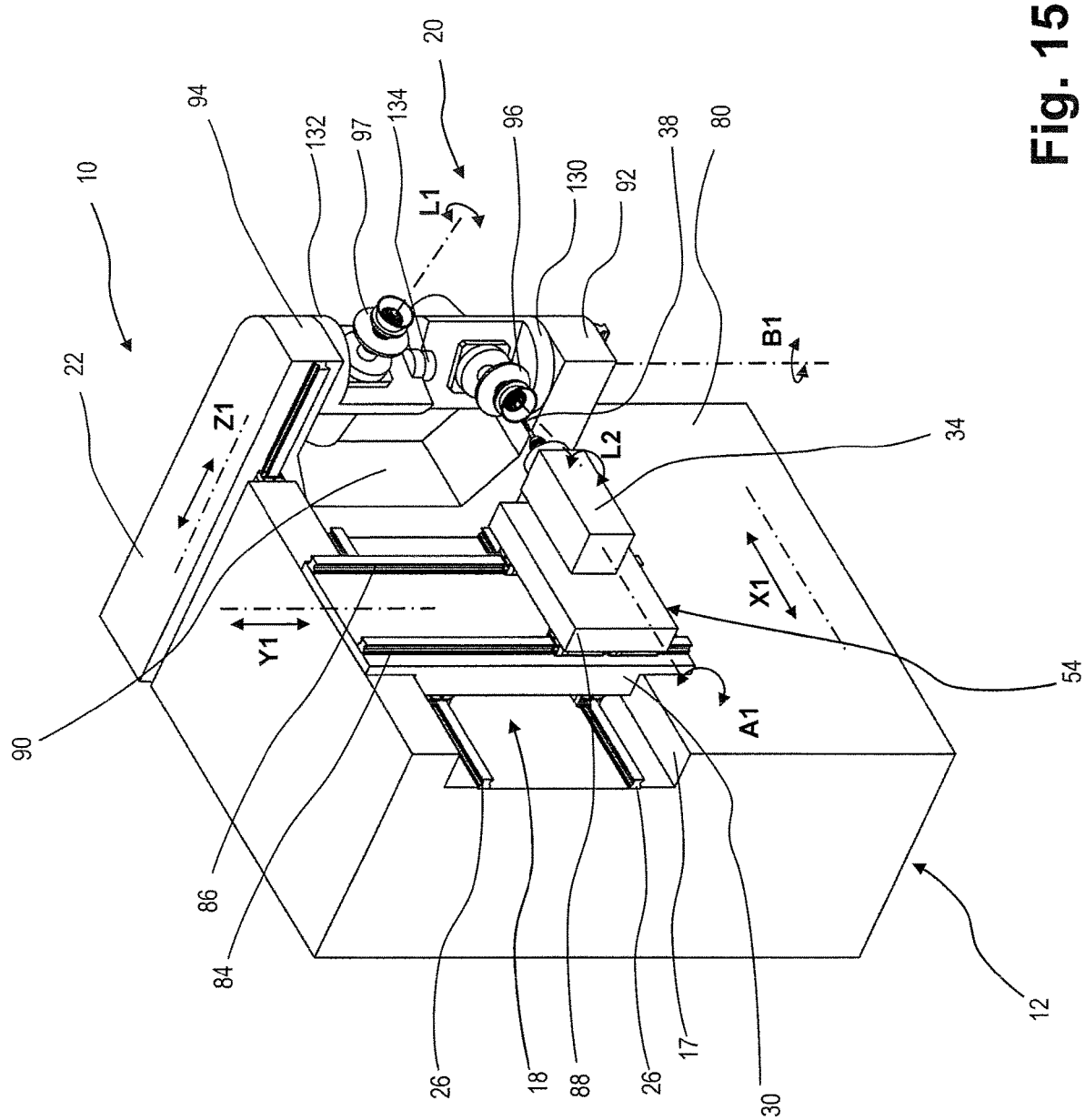

The invention is explained by way of example below with reference to the accompanying Figures, which show:

FIG. 1 a three-dimensional view of a first embodiment of the device according to the invention;

FIG. 2 a front view of the inventive device according to the first embodiment;

FIG. 3 a side view of the inventive device according to the first embodiment from the right, and FIG. 4 a plan view of the inventive device according to the first embodiment;

FIG. 5 a three-dimensional view of a second embodiment of the inventive device, FIG. 6 a front view of the inventive device according to the second embodiment, FIG. 7a a three-dimensional view of a third embodiment of the device according to the invention, FIG. 7b a three-dimensional view of an embodiment which is modified with respect to FIG. 7a with an additionally rotatable workpiece support arrangement, FIG. 7c a three-dimensional detailed view of FIG. 7b, FIG. 8 a three-dimensional view of a fourth embodiment of the device according to the invention, FIG. 9 a side view of a fifth embodiment of the device according to the invention, FIG. 10 a three-dimensional view of the rocker and machining unit of the fifth embodiment of the device according to the invention, FIGS. 11 to 14 different views of possible embodiments of the rocker according to the present invention, and FIG. 15 a three-dimensional view of a further embodiment of the device according to the invention.

The inventive device shown in FIGS. 1 to 4 for sharpening tools with cutters for machining, such as for example drills, milling tools or the like, is denoted as a whole by 10. It comprises a monolithic machine block 12 which is of a substantially cuboidal construction. The machine block 12 has a first functional surface 14 which is formed by its large-area front side, and furthermore has a narrower second functional surface 16 which is substantially perpendicular to its front side and is formed by a side face of the cuboid. A recess 17 and a displaceable workpiece support arrangement 18 in front of this are incorporated on the first functional surface 14 of the machine block 12. FIGS. 1 to 4 furthermore show that, on the second functional surface 16, a machining unit 20 is displaceably attached to the machine block 12 by way of a monolithic cuboidal support 12

To attach the workpiece support arrangement 18, a linear guide with two guide rails 24, 26, on which a slide 30 is displaceably guided in the direction of a first guide axis X1, is provided on the machine block 12. A pivot plate 32 which is pivotable about an axis of rotation C1 is provided on the slide 30. The pivot plate 32 supports a spindle arrangement 34 with a workpiece holder 36. A workpiece 38 is clamped therein. The workpiece 38 is rotatable about a machining axis A1 by way of the spindle arrangement 34.

Two guide rails 40, 42 are in turn arranged on the lateral functional surface 16 of the machine block 12. The support 22 is vertically displaceable on these guide rails along a guide axis Y1. On its substantially horizontal upper side 44, a further slide 50 is displaceably guided on the support 22 in the direction of a guide axis Z1 by way of two guide rails 46, 48. The machining unit 20 is arranged on this slide 50. This machining unit has a base 52 with an integrated rotational spindle on which a revolver head 54 is arranged. The revolver head 54 is rotatable about an axis of rotation C2.

The revolver head 54 is provided with an octagonal rotating body 56, on which three different machining spindles 58, 60, 62 and a measuring scanner 64 are attached to its four end faces. Each of the machining spindles 58, 60, 62 has different tools, such as for example a grinding disc 66 on the machining spindle 58, an eroding disc 68 on the machining spindle 60 and a further grinding disc 70 on the machining spindle 62. Each machining spindle 58, 60, 62 enables a rotation of the respective tool about an associated axis of rotation L1, L2, L3. In the illustration shown according to FIG. 1, the machining spindle 58 is located in an active position in which it enables the workpiece 38 to be machined. The two other machining spindles 60, 62 as well as the measuring scanner 64 are in a passive position and can be brought into an operationally active position by a suitable rotation of the revolver head 54 about its axis C2.

The individual machining spindles 58, 60, 62 can be dismantled as required and replaced by other machining tools, for example by other grinding discs or eroding discs with a different geometry, or by a laser head for laser machining the workpiece 38. The entire revolver 54 can also be removed and replaced by another arrangement with a single spindle, another multi-spindle arrangement or another tool or measuring scanner arrangement.

FIGS. 5 and 6 show a second embodiment of the device according to the invention. The reference numerals used in the description for similar or similar-acting components are the same as for the description of the first embodiment according to FIGS. 1-4.

FIGS. 5 and 6 show that, on its right-hand region in FIG. 6, the machine block 12 has an integrally formed projection 80 which is constructed with a substantially horizontally extending functional surface 82. A guide rail 48 is attached to this horizontal functional surface 82. The associated second guide rail 46 is attached to the vertically extending functional surface 16. The support 22 can be displaced in the horizontal direction relative to the machine block 12 by way of the two guide rails 46 and 48. This arrangement is advantageous in that the weight acting on the support 22 can be transferred to the machine block 12 by way of the guide rail 48 arranged on the horizontal functional surface 82.

It is furthermore shown that the revolver head 54 in this embodiment is attached to a slide 50 such that it is pivotable about the axis of rotation C2. The slide 50 is displaceable by way of the two guide rails 40, 42 in the vertical direction along the axis Y1 relative to the support 22 and therefore also relative to the machine block 12.

FIGS. 5 and 6 moreover also show the pivotal movement of the pivot plate 32 about the pivot axis C1 relative to the slide 30. FIGS. 5 and 6 thereby show a machining situation in which the grinding disc 66 acts on the workpiece 38 at an angle from above.

It should be noted that the second embodiment according to FIGS. 5 and 6 also has a recess 17 in which the slide 30 is received. Accordingly, the associated linear guides 24 and 26 in this variant embodiment are arranged in this recess 17 and are set back with respect to the front side of the machine block 12.

The mode of operation of the embodiment according to FIGS. 5 and 6 is the same as the mode of operation of the first embodiment according to FIGS. 1 to 4.

FIG. 7a shows a further embodiment of the invention. The reference numerals used in the description for similar or similar-acting components are the same as for the description of the previous embodiments according to FIGS. 1 to 6.

In the embodiment according to FIG. 7a, the machine block 12 is again provided with an integrally formed step-like projection 80, with the support 22 being mounted both on the vertical functional surface 16 and on the horizontal functional surface 82. It is furthermore shown that the monolithic machine block 12 is again provided with the recess 17, with the two linear guides 24 and 26 being arranged in this recess 17. In this variant embodiment, however, the slide 30 attached thereto is provided on its front side with two linear guides 84 and 86 which extend substantially in the vertical direction along the axis Y1. A further slide 88 is guided in the vertical direction relative to the machine block 12 along the axis Y1 by way of these two linear guides 84 and 86. The workpiece support arrangement 18 is arranged on this further slide 88 with its rotor-drivable spindle arrangement 34 and the workpiece 38 which is finally attached thereto.

FIG. 7a finally shows that the support 22 is provided with a recess 90 in its front region and extends in fork-like manner around this recess 90 with two arms 92 and 94. These two arms 92 and 94 form a respective bearing point in the region of their free end. The machining unit 20 is received between the two arms 92, 94, and more precisely, in this embodiment, in the form of a rocker 95 which is pivotable about the substantially horizontally extending pivot axis B1. The machining unit 20 is therefore mounted in the form of the rocker 95 on the fork-shaped support 22. In the case shown, it comprises two grinding discs 66 and 67, which can be driven in each case separately and independently of one another by way of separate spindles 96 and 97. The drive options are discussed below with reference to FIGS. 11 to 14. The machining unit 20 can be pivoted about the pivot axis B1 and positioned in any angular position relative to the workpiece 38. The further positioning of the machining unit 20 relative to the workpiece 38 takes place by way of the corresponding linear guides along the spatial axes X1, Y1, Z1 as shown.

FIGS. 7b and 7c show a modification to the embodiment according to FIG. 7a in terms of the guidance of the workpiece support arrangement 18. In addition to a linear displacement by way of the two guides along the axes X1 and Y1, the spindle arrangement 34 is arranged on a pivot plate 99 which is pivotable relative to the slide 88 about the pivot axis C1. In a manner similar to that of the embodiment according to FIG. 5, the spindle arrangement 34 in this variant embodiment can also still be pivoted with the workpiece 38 attached thereto.

FIG. 8 shows a further embodiment of the invention. The reference numerals used in the description for similar or similar-acting components are the same as for the description of the previous embodiments according to FIGS. 1 to 7b.

The embodiment according to FIG. 8 is of a similar construction to the embodiment according to FIG. 7a. However, the machine block 12 is constructed with angled surfaces 98, 100 on its front side so that its overall shape is that of a truncated wedge. It is also shown that, in the region of the recess 17, the functional surface 102 does not extend vertically but likewise at an angle. The angle of inclination α of the functional surfaces 98, 100 relative to the vertical is approximately 10°.

Apart from the inclination of the functional surfaces 98 and 100, the further construction of the embodiment according to FIG. 8 is similar to the construction according to the embodiment according to FIG. 7a. The machining unit 20 is again mounted in the support 22 by way of the rocker 95 and can be positioned rotationally about the pivot axis B1.

FIGS. 9 and 10 furthermore show a further embodiment of the invention. The reference numerals used in the description for similar or similar-acting components are the same as for the description of the previous embodiments according to FIGS. 1 to 8.

The embodiment according to FIGS. 9 and 10 is similar to the embodiment according to FIG. 8, but with the set-back functional surface 100 in the region of the recess 17 extending at an angle to the vertical with an angle of inclination α. On the other hand, the front functional surface 98 of the monolithic machine block 12 extends vertically. Accordingly, the slide 30 is of a wedge-shaped construction in its region which is received in the recess 17, so that the rear side 104 of the slide 30 extends substantially parallel to the functional surface 100 and is inclined through the angle of inclination α of 10°.

FIGS. 11 to 14 show different embodiments of the machining unit 20 when this is constructed with the rocker 95. The drive options are particularly notable here. All these embodiments can be combined with the inventive devices according to FIGS. 7a, 7b, 8, 9 and 10.

Figure 11:
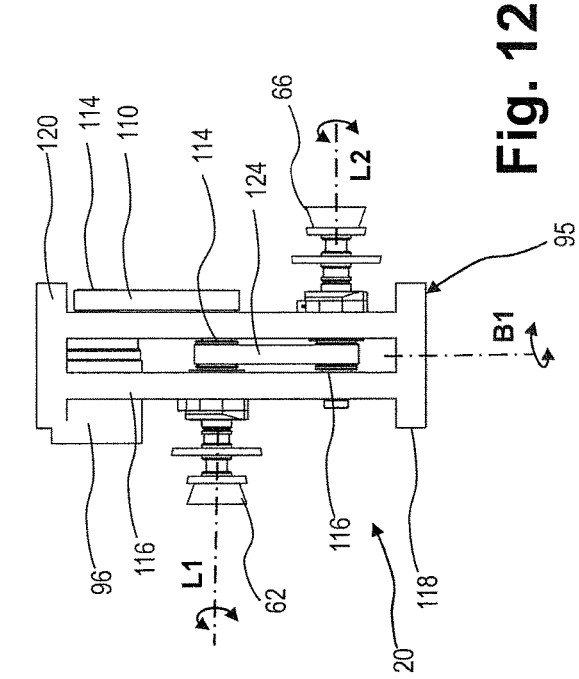

In the embodiment according to FIG. 11, only one tool 62 is provided. This is rotationally driven about the axis L1 by way of a motor 96, for which a drive belt 110 is used which is guided over two belt pulleys 112, 115. It is furthermore shown that the rocker 95 has a rear wall 116 and two flanks 118, 120.

Figure 12:
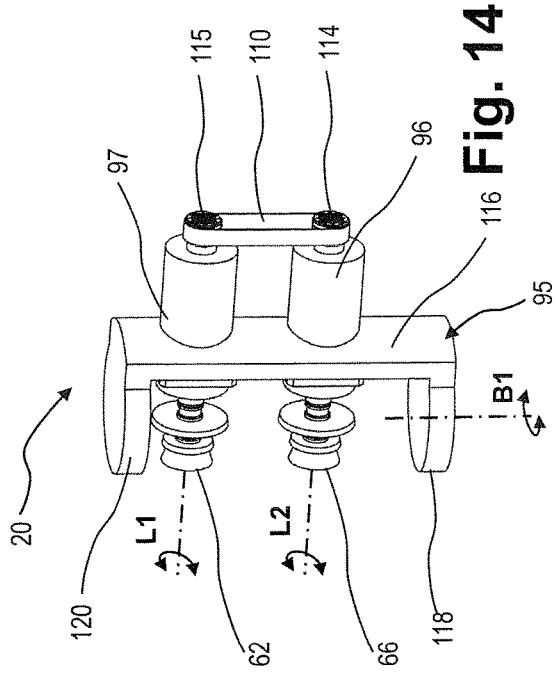

In the embodiment according to FIG. 12, two rotationally driven tools 62, 66 are provided, which are aligned in opposite directions to one another. Both are rotatable by way of substantially parallel axes of rotation L1 and L2. A single motor 96, which is arranged in the upper region of the rear wall 116 and the flank 120, serves as the drive. A first belt pulley 115 and a belt 110 drive a second belt pulley 114, which is coupled in rotationally fixed manner to the tool 62 so that this latter is driven rotationally about the axis of rotation L1. The belt pulley 114 is arranged in space-saving manner in the rear wall 116 of the rocker 95, for which the rear wall 116 has a recess 122. A further drive belt 124, which wraps around a further belt pulley 126, is arranged in this recess 122. This further belt pulley 126 is coupled in rotationally fixed manner to the second tool 66 and drives this rotationally about the axis L2.

In the embodiment according to FIG. 13, two commonly directed tools 62, 66 are attached to the rocker 95. These can be driven by way of the motor 96, which is arranged in the lower region of the rear wall 116 and the lower flank 118. Its output shaft is provided with the belt pulley 115 which is coupled to the belt pulley 114 by way of the drive belt 110. The belt pulley 114 serves on the one hand for driving the lower tool 66 about the axis of rotation L2. A further belt pulley 128, around which the drive belt 124 is guided, is furthermore coupled to this belt pulley 114 on a common shaft. This also wraps around the belt pulley 126 which is coupled in rotationally fixed manner to the upper tool 62 for the purpose of driving this latter about the axis of rotation L1.

FIG. 14 furthermore shows a variant embodiment in which the two tools 62 and 66 are in turn arranged with their two axes of rotation L1 and L2 in a common direction and are rotationally coupled by way of the two belt pulleys 114, 115 and the drive belt 110.

Finally, FIG. 15 shows a further embodiment of the invention. The reference numerals used in the description for similar or similar-acting components are the same as for the description of the previous embodiments.

The embodiment according to FIG. 15 is similar to the embodiment according to FIG. 7a. The essential difference from the embodiment according to FIG. 7a is that the embodiment according to FIG. 15 is not provided with a single rocker 95, but instead two rockers (denoted by the reference numerals 130, 132) are provided on the support 22 between the two arms 92, 94. These two rockers 130, 132 are each mounted in the two arms 92, 94 such that they are rotatable about the axis of rotation B1. The peculiarity of this embodiment consists in that the two rockers 130, 132 are mounted relative to one another by way of a pivot bearing 134 and are also pivotable relative to one another about the axis of rotation B1 so that the two machining axes of rotation L1 and L2 can be positioned independently of one another and can be moved either into a parallel alignment or into a skewed alignment, as shown for instance in FIG. 15. This enables a machining operation as shown in the situation according to FIG. 7a, i.e. with a parallel alignment of the two axes L1 and L2, or another machining operation with a skewed alignment, as shown in FIG. 15. For positioning and machining purposes, the two rockers 130, 132 and the spindles 96, 97 can be controlled numerically independently of one another.

With its various embodiments, the device according to the invention offers the advantage of a compact construction, since all the functional components are arranged in close spatial proximity on a single solidly and compactly constructed monolithic machine block 12. Complex structures, such as those used in the prior art, can therefore be avoided. The monolithic machine block 12 enables a mechanically advantageous support of the individual displaceable machine components as well as the favourable introduction of bearing forces.

The modular structure of the inventive devices enables adaptation to respectively desired machining situations, as demonstrated by the various embodiments. Therefore, the inventive device 10 according to the illustration can be constructed with a multi-equipped revolver head 54 for a plurality of different machining situations, as shown in the embodiments according to FIGS. 1 to 6. On the other hand, if fewer options are desired for machining workpieces, for example because the workpieces to be machined are less complex, the revolver 54 can also be replaced by a unit of a more simple design, as shown in the embodiments according to FIGS. 7 to 10.

The construction described above moreover offers the advantage that both the workpiece support arrangement and the machining unit are relatively easily accessible, which is advantageous in terms of the automation of machining procedures. On account of the good accessibility of these two components, it is possible to quickly and reliably replace workpieces after they have been machined in automated manner by way of a robot arm or a workpiece changer of a different construction. The same applies when replacing tools, which can be changed by way of a suitable robot or other tool changer using a magazine.

The invention claimed is:

1. A device for sharpening tools with cutters for cutting, comprising:
   a monolithic machine block with at least two functional surfaces arranged at an angle with respect to one another,
   a workpiece support arrangement for clamping a workpiece to be machined, at least one machining unit to which at least one tool can be attached for machining the workpiece, and a support, to which the at least one machining unit can be displaceably attached, wherein on a first functional surface of the at least two functional surfaces of the machine block, the machine block has at least one first linear guide for guiding the workpiece support arrangement along at least one first guide axis, and on a second functional surface of the at least two functional surfaces of the machine block, the machine block has at least one second linear guide for guiding the support along at least one second guide axis, wherein the first functional surface is allocated at least one third linear guide for guiding the workpiece support arrangement along a third guide axis, wherein the machining unit is displaceable relative to the support, wherein the workpiece support arrangement is constructed with a first axis of rotation for rotating the workpiece, wherein the at least two functional surfaces of the machine block are arranged substantially perpendicular to one another, wherein the at least one first guide axis, the at least one second guide axis, and the third guide axis span a coordinate system of non-parallel, mutually orthogonal axes, wherein the at least one first guide axis and the at least one second guide axis are arranged horizontally and wherein the third guide axis extends vertically, wherein the support has at least one fork for receiving at least one rocker on which the at least one machining unit is mounted such that it is pivotable at least about a second axis of rotation, wherein the at least one machining unit on the rocker has at least one rotationally driven spindle for driving different tools, and wherein the machine block has at least one projection extending away from the second functional surface that defines a projection surface which is non-planar relative to the second functional surface, wherein the at least one second linear guide comprises a first guide rail mounted to the second functional surface and a second guide rail mounted to the projection surface.

2. The device according to claim 1, wherein at least one of the two functional surfaces of the machine block is inclined with respect to the vertical.

3. The device according to claim 1, wherein the at least one first linear guide of the machine block is formed to extend substantially over the entire length of the first functional surface of the machine block.

4. The device according to claim 1, wherein the workpiece support arrangement is attached to a first slide guided along the at least one first linear guide.

5. The device according to claim 4, wherein on the first slide, the third linear guide is arranged for guiding the workpiece support arrangement along the third guide axis.

6. The device according to claim 1, wherein the first and second axis of rotation extend substantially parallel or orthogonally to one another.

7. The device according to claim 1, wherein the workpiece support arrangement is pivotable about a third axis of rotation relative to the first slide.

8. The device according to claim 7, wherein the workpiece support arrangement is attached to a pivot arm or pivot plate which is pivotable about the third axis of rotation relative to the first slide.

9. The device according to claim 1, wherein on the at least one fork, a plurality of rockers are mounted such that they are pivotable relative to one another and relative to the at least one fork about the second axis of rotation, wherein two mutually adjacent rockers are mounted relative to one another by way of a joint portion.

10. The device according to claim 1, wherein the workpiece support arrangement has a first rotational spindle with which the workpiece is rotatable about a workpiece longitudinal axis.

11. The device according to claim 1, wherein the at least one machining unit has at least one grinding disc and/or at least one eroding tool and/or at least one laser head and/or at least one measuring sensor.

12. The device according to claim 1, wherein at least one of the at least two functional surfaces is arranged in a recess provided in the machine block.

* * * * *